United States Patent
Selway

(10) Patent No.: US 7,433,748 B2
(45) Date of Patent: Oct. 7, 2008

(54) SYSTEM AND METHOD FOR CONTROLLING A DESIGN PROCESS BY SPECIFYING ACTIVE VARIABLES AND PASSIVE VARIABLES

(75) Inventor: James Walker Selway, Rosanna (AU)

(73) Assignee: Amcor Limited, Victoria (AU)

( * ) Notice: Subject to any disclaimer, the term of this patent is extended or adjusted under 35 U.S.C. 154(b) by 0 days.

(21) Appl. No.: 10/530,011

(22) PCT Filed: Sep. 30, 2003

(86) PCT No.: PCT/AU03/01293

§ 371 (c)(1),
(2), (4) Date: Jun. 28, 2005

(87) PCT Pub. No.: WO2004/031995

PCT Pub. Date: Apr. 15, 2004

(65) Prior Publication Data

US 2006/0052890 A1    Mar. 9, 2006

(30) Foreign Application Priority Data

Oct. 2, 2002    (AU) .............................. 2002951790

(51) Int. Cl.
*G06F 19/00* (2006.01)
(52) U.S. Cl. ........................ 700/103; 700/97
(58) Field of Classification Search ................. 700/97, 700/103
See application file for complete search history.

(56) References Cited

U.S. PATENT DOCUMENTS 4,912,657 A    3/1990    Saxton et al. ............... 345/853

5,301,118 A    4/1994    Heck et al. .................. 700/119

(Continued)

FOREIGN PATENT DOCUMENTS

EP    0 473 522    3/1992

(Continued)

OTHER PUBLICATIONS

Contreras et al, "I-SS integrated supervision systems approach based on interactive components" IEEE International Conference on Emerging Technologies and Factory Automation Oct. 15-18, 2001.

(Continued)

*Primary Examiner*—Ryan A Jarrett
(74) *Attorney, Agent, or Firm*—Nixon & Vanderhye PC

(57) ABSTRACT

A system for controlling a design process having a first design sub-process and a second design sub-process, outcomes of one of the first and second design sub-processes being linked to outcomes of the other of the design sub-processes by a relationship between one or more first design sub-process variables and one or more second design sub-process variables. The system comprises a user configurable interface between the first and second design sub-processes, the interface allowing a user to the system to control the design process by specifying which of the one or more variables are active variables which can have their domains modified by at least one process within the sub-process to which the variable belongs and which of the one or more variables are passive variables which have their domains determined within allowable values by the domains of the other variable(s) in the relationship.

25 Claims, 4 Drawing Sheets

U.S. PATENT DOCUMENTS

| | | | |
|---|---|---|---|
| 5,552,995 A | 9/1996 | Sebastain | 700/97 |
| 5,655,087 A | 8/1997 | Hino et al. | 705/29 |
| 5,765,137 A | 6/1998 | Lee | 705/7 |
| 5,815,394 A | 9/1998 | Adeli et al. | 700/97 |
| 5,844,554 A | 12/1998 | Geller et al. | 345/744 |
| 5,912,678 A | 6/1999 | Saxena et al. | 700/103 |
| 6,009,406 A | 12/1999 | Nick | 705/10 |
| 6,041,263 A | 3/2000 | Boston et al. | 700/32 |
| 6,125,374 A | 9/2000 | Terry et al. | 715/502 |
| 6,249,714 B1 | 6/2001 | Hocaoglu et al. | 700/97 |
| 6,253,115 B1 | 6/2001 | Martin et al. | 700/97 |
| 6,295,513 B1 | 9/2001 | Thackston | 703/1 |
| 6,327,551 B1 | 12/2001 | Peterson et al. | 703/1 |
| 6,882,892 B2 * | 4/2005 | Farrah et al. | 700/97 |
| 2002/0116158 A1 | 8/2002 | Heching et al. | 703/2 |

FOREIGN PATENT DOCUMENTS

| | | |
|---|---|---|
| EP | 802493 A2 | 10/1997 |
| WO | 95/32476 | 11/1995 |
| WO | WO01/54004 A1 * | 7/2001 |
| WO | WO 02/21345 A1 | 3/2002 |

OTHER PUBLICATIONS

International Search Report.
DeNola Boxboard Containers International Feb. 2000, pp. 29-30 "Package Design & the Internet".
Hardwick et al IEEE Internet Computing Jan.-Feb. 1997 "Data Protocols for the Industrial Virtual Enterprise".
Search Report dated May 23, 2008 in EP 03 74 7703.

* cited by examiner

SYSTEM AND METHOD FOR CONTROLLING A DESIGN PROCESS BY SPECIFYING ACTIVE VARIABLES AND PASSIVE VARIABLES

This application is the US national phase of international application PCT/AU2003/001293 filed 30 Sep. 2003 which designated the U.S. and claims priority of AU 2002951790, filed 2 Oct. 2002, the entire contents of each of which are hereby incorporated by reference.

The present invention relates to a system for controlling a design process which finds particular application in the packaging industry.

FIELD OF THE INVENTION

In many industries the design process consists of a number of sub-design processes which relate to the overall design of a product or process. These individual design sub-processes must be combined to produce an integrated outcome. For example, in the packaging industry in order to deliver a product to consumers there needs to be a single consistent outcome including the flexible wrap which surrounds the product, the carton in which the flexibly wrapped products are contained for presentation at retail stores and the corrugated box in which the individual cartons are shipped to the retailer. The individual elements are the result of a number of individual design sub-processes which need to be combined and consistent overall outcome.

Previous approaches to integrating design sub-processes have generally been linear. That is, an ad hoc decision has been reached deciding which design sub-process to begin with and the order in which the design sub-processes will be carried out. As a result, there is limited intelligent and timely interaction between related design sub-processes as well as little to ensure that the outcomes of individual design sub-processes are consistent with the goals of the design process and satisfy some local and/or global optimum requirement. Accordingly, the outcome of the design process is often far from optimum and the design process itself can follow a convoluted path requiring many iterations. As a result, the design process typically takes much longer and requires much more effort than is desirable.

Further, existing systems make it difficult for different entities to engage within an integrated design space.

In our PCT application, PCT/AU01/00056, we proposed a system which is designed to allow the integration of a number of related software design processes to ensure that the solutions of a first design sub-process module do not conflict with solutions of a second design sub-process.

We now propose a system for controlling a design process which is able to control the manner in which the design process is carried out.

SUMMARY OF THE INVENTION

The invention provides a system for controlling a design process having a first design sub-process and a second design sub-process, outcomes of one of the first and second design sub-processes being linked to outcomes of the other of the first and second design sub-processes and vice versa by a relationship between one or more first design sub-process variables (A) and one or more second design sub-process variables (B), the system comprising:

a user configurable interface between said first and second design sub-processes, said user configurable interface allowing a user of said system to control said design process by specifying which of said one or more variables (A,B) are active variables which can have their domains modified by at least one internal process within the sub-process to which the variable belongs and which of said one or more variables (A,B) are passive variables which have their domains determined within allowable values by the domains of the other variable or variables in said relationship, whereby specifying which of the variables are active variables and which are passive variables determines the manner in which said relationship is evaluated and the dominance of a sub-process in the overall design process.

In one embodiment the user configurable interface defines a plurality of possible relationships between the first and second design sub-processes and said user configurable interface has relationship selection means to allow a user to select at least one relationship from the plurality of relationships.

The relationship selection may allow a user to select a plurality of relationships.

In one embodiment, said user configurable interface is configured to specify which variables are treated as active and which are treated as passive on the basis of the selected relationship.

In one embodiment, said user configurable interface has goal specification means alternatively or in combination with the above which allows a user to specify a goal or goals of said design process and wherein said user configurable interface is configured to specify said relationship on the basis of the user specified goal or goals.

There may be more than one relationship between the first and second design sub-processes.

In one embodiment, the user configurable interface is configured to allow a user to specify two or more relationships and a conditional rule for selecting which of the two or more relationships is used.

The relationship may comprise either:

one or more rules; or one or more algorithms; or a combination of one or more rules and one or more algorithms.

There may be more than two sub-processes.

In which case, there may be relationships between either all or some of the sub-processes.

In some embodiments, the system allows constraints to be placed on a domain of a variable.

In these embodiments, the system typically allows the constraints to be defined as "hard" constraints which cannot be breached or "soft" constraints which can be breached if other conditions are satisfied.

In one embodiment, the system further comprises an optimisation engine for optimising the design process using one or more rules to analyse available solutions of the design process.

The optimisation engine may be configured to compare potential solutions to the design process with pre-existing solutions to enable pre-existing solutions to be brought to the attention of a user.

In one embodiment, said user configurable interface has relationship specification means for specifying the relationship between the sub-processes.

The invention also provides a method for controlling a design process having a first design sub-process and a second design sub-process, outcomes of one of the first and second design sub-processes being linked to outcomes of the other of the first and second design sub-processes and vice versa by a relationship between one or more first design sub-process variables (A) and one or more second design sub-process variables (B), the method comprising:

providing a user configurable interface between said first and second design sub-processes, and configuring said user configurable interface to control said design process by specifying which of said one or more variables (A,B) are active variables which can have their domains modified by at least one internal process within the sub-process to which the variable belongs and which of said one or more variables (A,B) are passive variables which have their domains determined within allowable values by the domains of the other variable or variables in said relationship, whereby specifying which of the variables are active variables and which are passive variables determines the manner in which said relationship is evaluated and the dominance of a sub-process in the overall design process.

DESCRIPTION OF THE PREFERRED EMBODIMENT

A design process has the end goal of providing a unified outcome of the design process which can then be put into practice. Complex design processes are typically the combination of a plurality of design sub-processes managed by different entities. Here, the term "entity" is used to designate a person, group of people or organisation or a software module which has responsibility for a design sub-process. That is, the entities are not necessarily different legal entities although they may be—for example, when two entities compete to provide the outcome of a particular sub-process.

It will be appreciated that for a given problem specification each sub-process is capable of producing a wide variety of outcomes but these outcomes must be integrated. Accordingly, it will also be appreciated that in controlling the overall design process there are a number of challenges. These include ensuring that the outcome satisfies the constraints of individual sub-design processes, allowing flexibility in the design process and, as far as possible, ensuring that the outcome is near optimal.

We have recognised that this requires the ability to exercise control over the influence that individual design processes and design variables have on the overall outcome of the design process.

Figure 4:
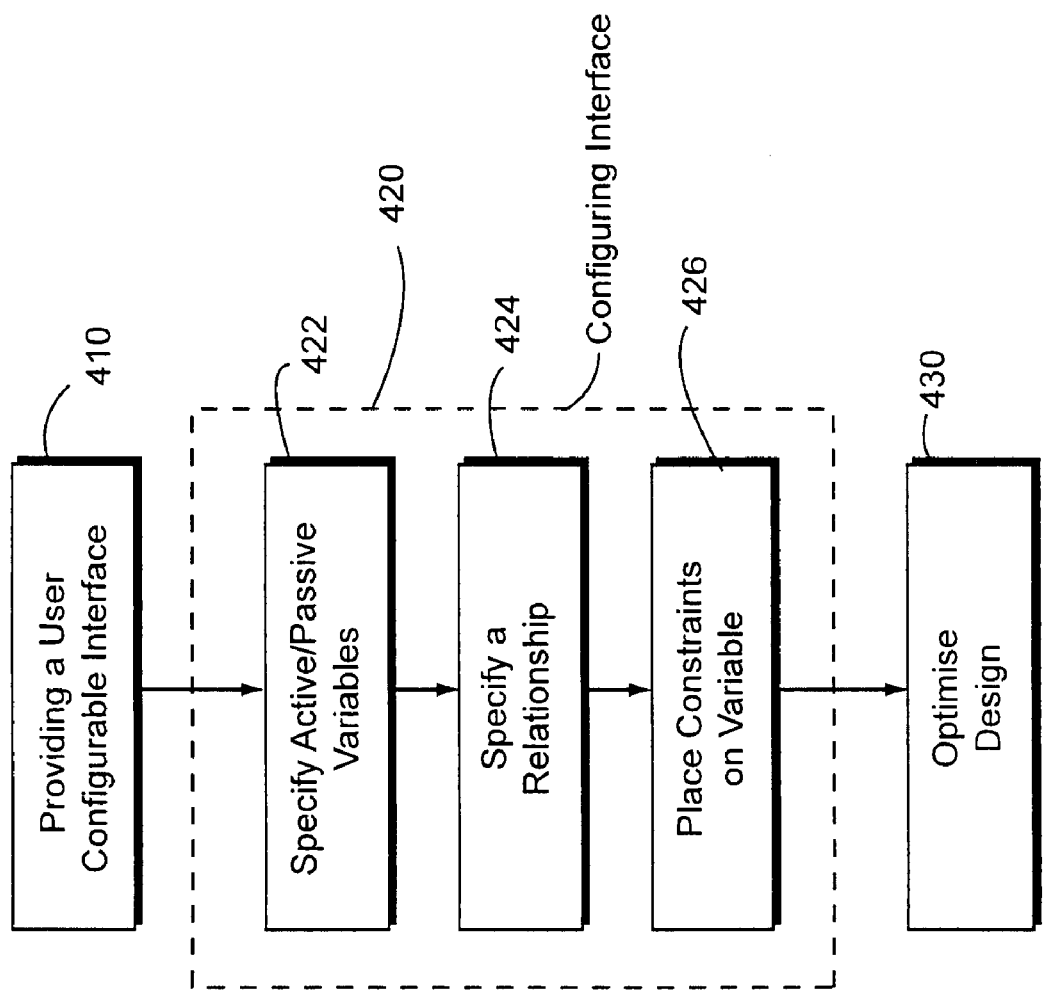
FIG. 4 is a flowchart for the Example 1 methodology.

Accordingly, embodiments of the present invention provide a system for controlling a design process which includes a user configurable interface between design sub-processes which allows a user to control the influence individual design sub-processes have on the outcome of the overall design process (see box 410 in FIG. 4). The embodiments of the system also allow the design processes to be more flexible than existing design processes and to control collaboration of different design processes.

The user configurable interface is designed to be used by a user who has control of the overall design process. In the preferred embodiment this user is designated as the "project manager" in order to distinguish the project manager from other users of the system—e.g. users of individual sub-processes.

In the preferred embodiment, the user configurable interface is a web (internet or intranet) or client server based application which allows the project manager to control the design process as well as for the individual sub-processes.

The project manager specifies which design sub-process and which variables of individual design sub-processes will form part of the overall design process as well as defining the manner in which they will influence the overall design process. Further, the user configurable interface allows the project manager to specify the relationships between individual variables which are used in the rules which are used in order to evaluate which outcome or outcomes should be adopted for the design sub-process. Herein the term "variable" is used in a broad sense to refer to the aspects of a design sub-process which may be varied. In some cases a sub-process will also have "parameters" which are generally unchanging variables and which need to be made available to another process—e.g. because of a relationship with that process.

The relationships between the sub-processes will determine the extent to which sub-processes are dependent on each other—i.e. the extent of coupling of individual design sub-processes to other sub-processes.

The user configurable interface will now be described in relation to a design process which involves first and second sub-processes for simplicity of description. Persons skilled in the art will appreciate that the invention can be extended to any number of sub-processes.

In the web-based application interface a use of a design sub-process is informed of required tasks by an e-mail message or other appropriate messaging system, typically by a workflow process, and with a hyperlink to the system. The user only has access to appropriate pages associated with a set of tasks they are required to perform and if required their task brief. The pages include a set of choice or input variables, which are implicitly constrained. The current constraints for variables are given where appropriate and editable if active and not if passive (e.g. visible but greyed out). Depending on the variable, the constraint may be expressed as a range or as a set of discrete values. Alternative techniques could include a portal or an auction process where the participants would be supplied with a specification (containing similar variables and constraints) to satisfy and provide the solutions and associated quotes through the portal which would then be incorporated into the integrated process.

Setting up the Design Process

In the preferred embodiment, a configuration module is used to configure the interface (see box 420 in FIG. 4). The configuration module allows a project manager to specify the goals of the design process. The system then uses embedded logic to determine from the goals which sub-processes and which variables will form part of the interface between sub-processes as well as which rules and algorithms are used to specify the relationships between the variables of the first design sub-process and the variables of the second design sub-process. In this way, the user configurable interface is able to embody user experience. However, the system also allows a user to individual tailor the interface. That is, the project manager may either specify the interface from scratch or may modify the interface which is provided by the system in response to the project manager defining their goals.

Variable, Algorithms and Rules

The three main components which allow the system to be implemented are the manner in which the variables, algorithms, rules and goals are handled.

Variables can be assigned different characteristics which determine the manner in which relationships between variables are evaluated and the dominance of a sub-process in the overall design process. Variables can be assigned either an "active" or "passive" nature (see box 422 in FIG. 4).

The domain (i.e. the set of possible values) of a "passive" variable will be predominantly determined by other variables, and rules and algorithms. That is, a passive variable becomes a dependant variable in a relationship with other variables. The relationship is typically specified by one or more algorithms and/or one or more rules (see box 424 in FIG. 4). Accordingly, the sub-process to which the variable belongs will respond to changes made to the variable through its relationship with other variables but will not be able to modify its values. However, the sub-process will be able to constrain the domain of the variable so that it does not take unworkable values—i.e. so that it takes allowable values (see box 426 in FIG. 4).

In contrast, an "active" variable can be modified by the sub-process with which it is related again, within constraints set for that variable by the sub-process. Therefore, changes to an active variable by a sub-process will propagate to variables with which the active variable is related by way of the relationship specified by an algorithm and or rule.

A variable may also have the characteristic of being a "hard" or "soft" constraint.

Typically, a "hard" constraint will be applied by the sub-process. A hard constraint in effect indicates that the sub-process is incapable of providing solutions which lead to that variable taking a value outside a particular range so that if a relationship with another variable calls for the variable to change, there is a mechanism for preventing it from taking an unacceptable value. A "soft" constraint, on the other hand, could be applied by either the sub-process or the user interface. Therefore, the project manager may apply a soft constraint to indicate the constraint is not significant in the overall scheme of things. For example, a project manager may place a soft constraint on the area or volume efficiency of a packing arrangement or material performance to cost ratio. The latter are typical examples of constraints where there is not a strong degree of certainty in their choice and hence there may not be a good reason to adhere to the constraint. In addition in some cases they may not have much of an overall affect on an optimisation objective function (e.g. cost), and hence should not be a strong determinant of the solution space (i.e. the possible outcomes), whereas a hard constraint generally has a strong physical limit. During optimization (see box 430 in FIG. 4), if the current solutions do not meet a specified criteria, the optimisation engine may modify the domain of a variable having a soft constraint to search for better solutions. Thus, soft constraints can prevent excellent solutions being dismissed for spurious reasons—for example because an inappropriate and unrealistic or uncertain choice of efficiency level which may not in fact have a great deal of influence on the cost effectiveness of the solution. The system can be configured so that the type of constraint defaults to soft for some types of variables.

From the perspective of a sub-process a soft constraint may indicate that the sub-process prefers to provide solutions within a specific range but will move outside of that range if necessary.

The rules are embodied by one or more sets of rules engines. The rules engines manage changes and variables against the goals of the design process. The rules engines are a type of software agent and have the ability to incorporate and evaluate rules, rule goals, goal decomposition and assertions and initiate choices and actions based on in-based logic.

Algorithms take a number of different forms. Algorithms may specify a relationship between variables for use in solution generation. Algorithms may also manage the effect of changes to ensure that the constraints of variables are not breached and to ensure that solutions proposed by one sub-process are allowable by another process. That is, the algorithm propagates constraints and manages variable domains.

Algorithms may also conduct the procedure of searching for solutions, analysing performance of solutions, cost estimation, size determination and manufacturing load.

Figure 1:
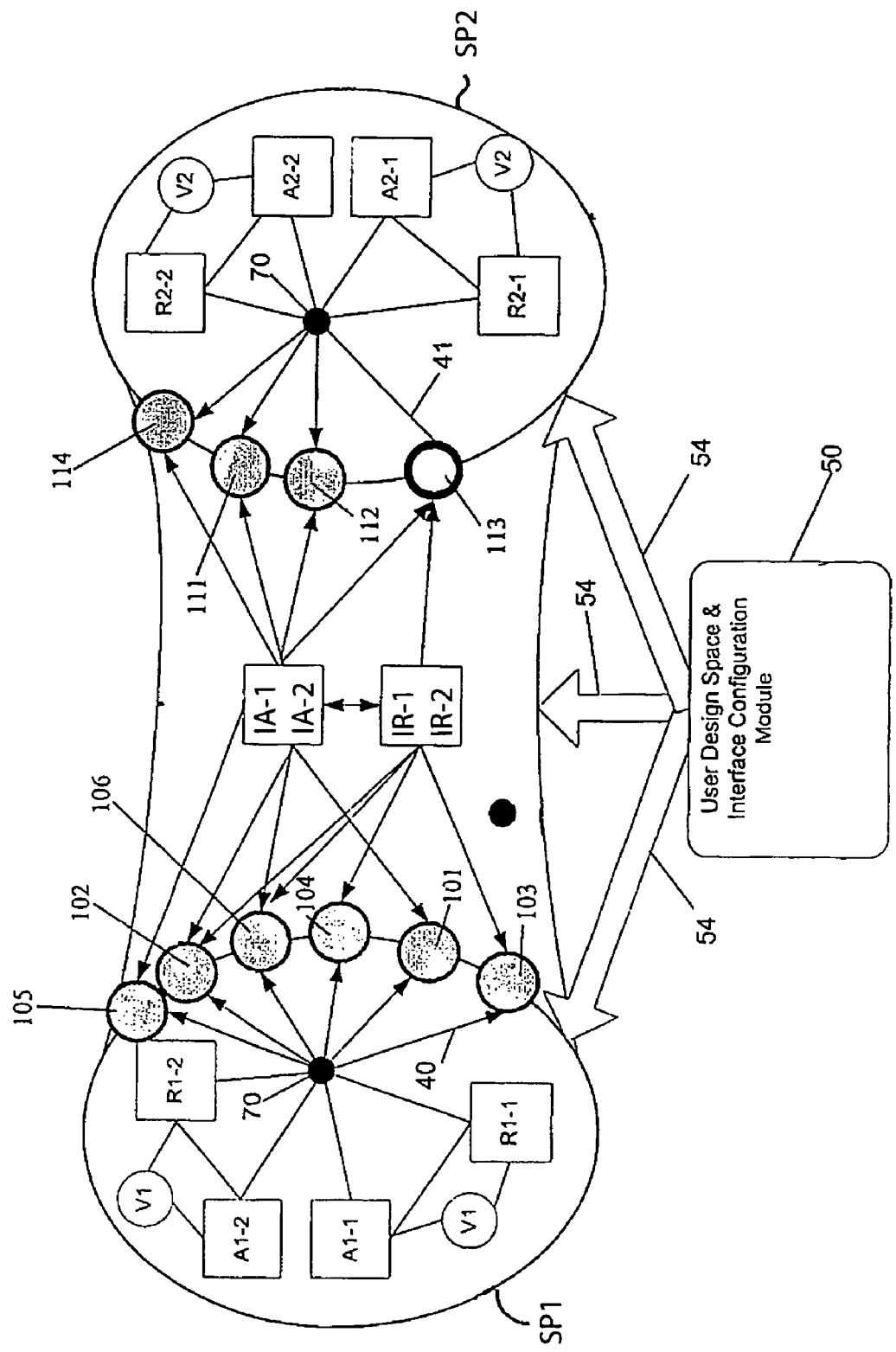
FIG. 1 shows an interface between first and second design sub-processes.
Figure 2:
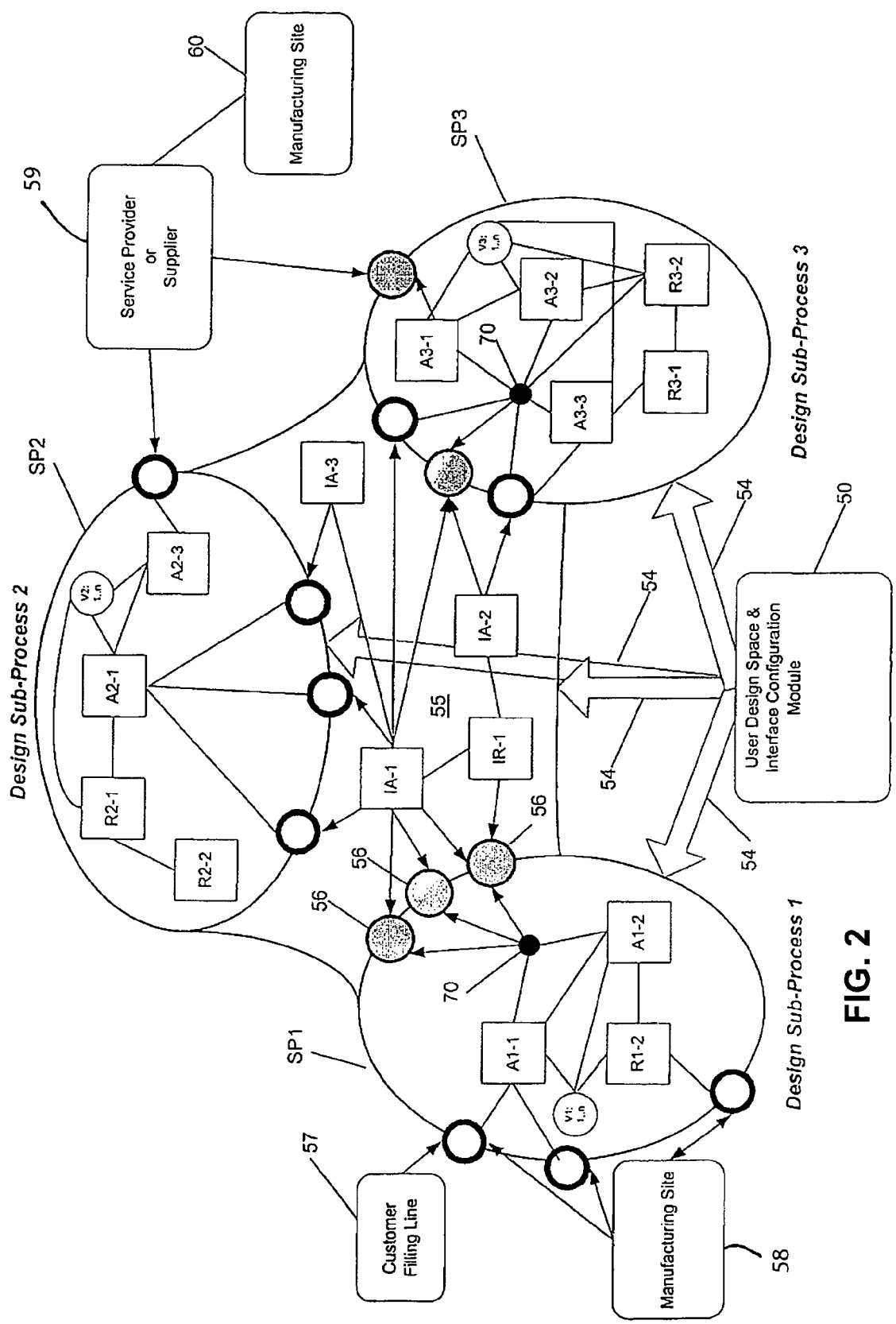
FIG. 2 shows an interface between three sub-processes.
Figure 3:
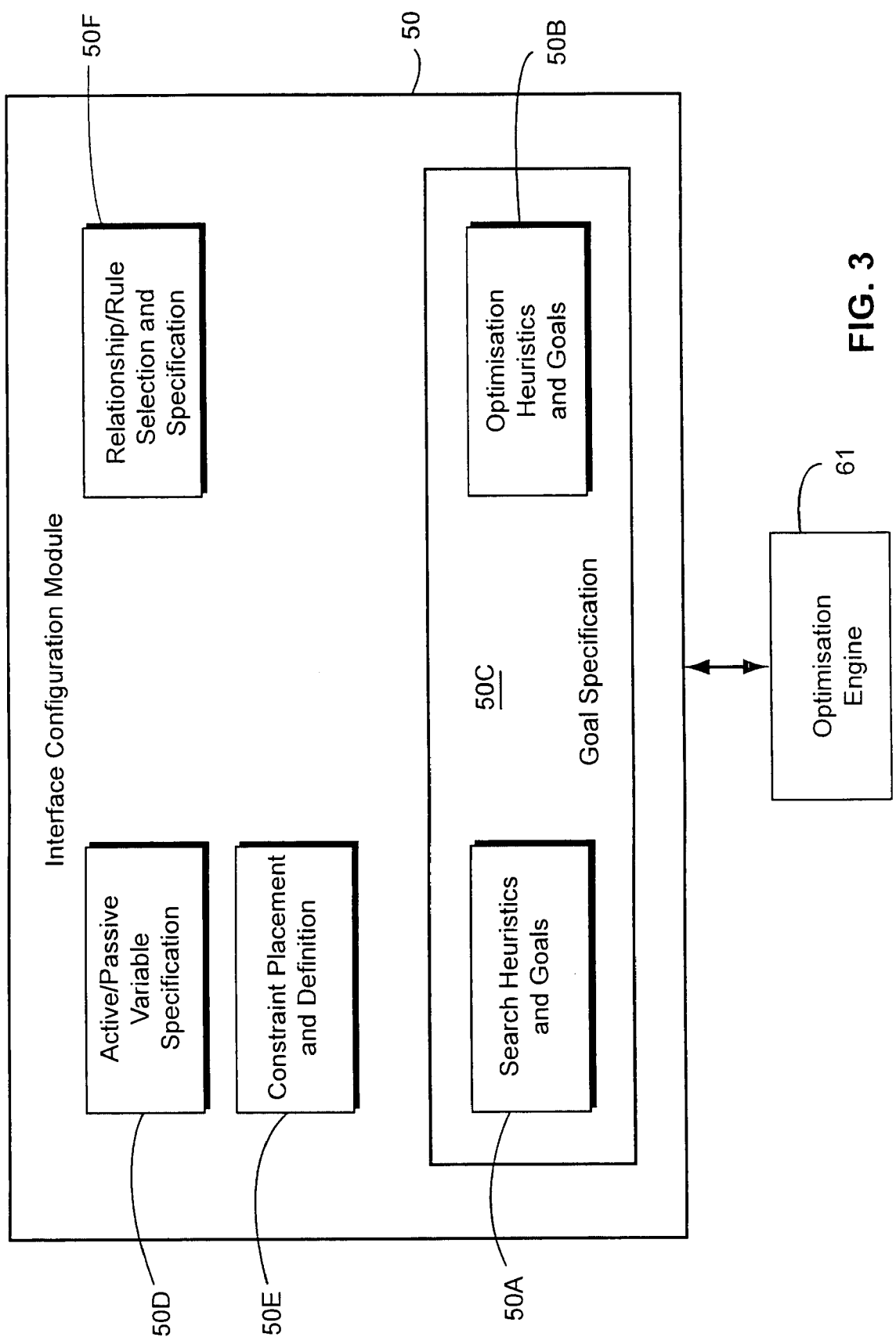
FIG. 3 shows details of the interface configuration module 50 shown in FIG. 1.

Two exemplary examples will now be described in relation to FIGS. 1 and 2. In FIGS. 1 and 2, shaded circles represent active interface variables, circles with thick borders represent passive interface variables and circles with thin borders represent internal variables. The letter A is used to designate algorithms, the letter R is used to designate rules and the letter V a set of variables. The numeral to the left of the hyphen indicates to which sub-process the algorithm or rule belongs, and the numeral to the right of the hyphen indicates the number of the algorithm or rule within the module. The letter I indicates that the algorithm or rule belongs to the interface.

EXAMPLE 1

In order to facilitate understanding of the invention, an example of an embodiment involving two sub-processes will be described where the first sub-process (SP1) is a carton and the second sub-process (SP2) is a corrugated box. FIG. 1 provides a schematic representation of the components in the system, eg variables, algorithms and rules. FIG. 1 shows the connection between variables, algorithms, and rules and the passive and active interface variables. In this example all algorithms and rules may modify or examine an interface variable. Accordingly, in FIG. 1, all lines are shown passing through a central hub 70 to indicate that all rules/algorithms may communicate with all variables. The directed lines (i.e. lines with arrows, e.g. line 40) show where a sub-process algorithm or rule may change an active variable. As shown within the second sub-process SP2 where a passive variable cannot be changed by the algorithms and rules of the sub-process, non-directed lines (i.e. lines without arrows, e.g. line 41) show communication/interaction between components. There will also be cases where a rules component does not interact with the interface variables directly but does so via an algorithm.

Box 50 indicates the user interface configuration module which is used by the project manager to configure the design process as indicated by arrows 54. Interface configuration module 50 provides goal specification 50C (including search heuristics and goals 50A and optimisation heuristics and goals 50B); active/passive variable specification 50D; constraint placement and definition 50E; and relationship/rule selection and specification 50F. Optimisation engine 61 optimises the design process.

The project manager may choose one of the following performance goals or sub-goals:
1. The strengths of the carton and box to be determined independently
2. A proportion of the strength of the carton to be used to reduce the strength requirement of the box
3. A proportion of the strength of the box to be used to reduce the strength requirement of the carton
4. A combination of goals 2 and 3 which minimises the integrated carton/box cost.

The project manager selects goal 2, the configuration module configures the interface so that the interface algorithm IA-1 determines a proportion of the carton strength to be used to reduce the required strength of the box during the design process. This goal is appropriate, for example, in a situation where the carton has already been designed or where the primary savings are being sought from the box.

The project manager selects as part of the project configuration (specifically or by a previously configured and named configuration) a series of goals to be satisfied including goal 2 above. The system activates the appropriate algorithms and rules and sets variables as having passive/active constraints and with an associated soft/hard nature. In this embodiment, the system is able to activate algorithms within the sub-process. In other embodiments, particularly where a sub-process is run by a different business, the system may deliver a specification to the sub-process advising it of the required variables and, for example, the strength/performance algorithm which must be used by the sub-process.

In this example, the system itself activates:
within SP1
  An algorithm and a rule for strength/performance A1-1 & R1-1, and an algorithm and a rule for constraint management A1-2, R1-2.
within SP2
  An algorithm and a rule for strength/performance A2-1 & R2-1, and an algorithm and a rule for constraint management A2-2 & R2-2.
within the interface
  An algorithm and a rule for strength/performance interaction IA-1 & IR-1, and an algorithm, IA-2 and rule IR-2 for constraints management.
Globally
  A global Constraints Manager & Global Rules Engine maintaining overall control of constraints management, utilising the algorithms and rules and goals such as detailed above e.g. by resolving conflicts between algorithms.

These choices set variables as "active" and "passive" which are in principle straightforward—in setting up a project select the set of goals which implicitly contained such choices within a set of goals. Alternatively, the project manager may choose to engage this directly. The user for each sub process variables will be presented with options and a guide to choices (e.g. a wizard).

Here the sets of internal variables represented within V1 within SP1 are size, board structures, environment, art components and art template. A1-1 is the "selected" set strength/performance algorithm for SP1 and R1-1 the associated rules. For estimates of carton compression loading and/or panel bulge, each performance relationship in A1-1 is associated with one or more styles. An output set from algorithm A1-1 is the maximum allowable load and associated stiffness (i.e. load deflection response). This will typically occur during solution generation, locally and or globally. Before solution generation begins, eg during user interaction, the interface determines whether there are viable solutions of the design process by determining whether constraints of one sub-process prevent the other sub-process from producing valid solutions. During the variable domain definition phase A1-2 processes/manages constraints and variable domains, including constraint propagation and R1-2 the associated rules. Subsequently, the set of internal variables associated with SP1 are dynamically set/modified by a user or users associated with SP1, which are monitored and processed by A1-2. Amongst other functions, A1-2 sets or validates the domains of variables internally and if possible on the SP1 interface. In addition IA-2 propagates this change to SP2 for processing and validation via the constraint manager in SP2 namely A2-2. Similar comments apply to changes to variables within SP2.

Constraint propagation is handled by an appropriate constraint programming technique. Constraint Programming (CP) is a paradigm for constructing and solving classes of problem in which the domains of the variables involved are constrained and are understood in the context of a constraint domain. The problem solution consists of determining combinations of variable values that are consistent within the domain/constraints. This is termed constraint satisfaction. A Constraint Solver software component determines if the problem is satisfiable, for every constraint. Given a particular constraint domain (Real, FD Finite Domains, Integer, Rational, Boolean, Tree), associated Constraint Solver and Constraint Simplifier defines a language for developing programs and a means of goal(s) evaluation. A constraint domain details the primitive constraints, e.g. $Y \leq aX$, and a constraint is a conjunction of primitive constraints, e.g. $Y \leq aX \wedge Y \geq bZ + cX$. The Solver and Simplifier are used in the evaluation of goals. Such a system typically includes backtracking, bounds consistency for pruning domains, propagation rules and branch and bound solvers for optimisation problems.

An example of propagation rules used in the pruning of domains, e.g. for $X=Y \times Z$ (for values greater than zero) are:

$$X \geq Y_{min} \times Z_{min}, \; X \leq Y_{max} \times Z_{max}$$

$$Y \geq X_{min}/Z_{max}, \; Y \leq X_{max}/Z_{min}$$

$$Z \geq X_{min}/Y_{max}, \; Z \leq X_{max}/Y_{min}$$

Some typical relationships and interactions associated with domain and constraint management are as follows. The domains of the variables VI are checked for consistency against the design logic and constraint satisfaction. This is carried out by the rules engine R1-2 and constraint manager A1-2, the domains are modified accordingly and the user who has made the change informed in the event that the constraints cannot be satisfied (and why they cannot be satisfied). For example if a material cannot be used in a specific environment or with any of the styles listed in the style domain then this material is deleted from the material domain associated with V1 and the SP1 interface. This decision and its dependencies may be stored for future consideration if and when the basis for the decision is no longer valid.

The rules engine is implemented using constraint logic programming. Constraint logic programming (CLP) combines the constraint programming paradigm with a logic programming paradigm. Logic programming (LP) deals with symbolic logic computation and is primarily declarative in nature (what) rather than procedural (how). The former is the focus of the programmer/problem modeller and the latter is essentially facilitated by the system. The modelling paradigm is concerned with facts, rules, goals, queries, predicate logic (first order) etc. The CLP paradigm defines a family of languages. Prolog is an example wherein a LP programming language is extended to encapsulate CP, by introducing other types of constraints in addition to matching, to give an essentially CLP paradigm. CLP's are made up of rules, which can be recursive. These let the programmer define predicates which are simply user defined constraints or relations. Multiple rules allow a predicate to have more than one possible definition.

CLP essentially separates the problem solving process from the constraint management. Rules engines can direct the problem solving process by making choices of values to be assigned to variables but can also reject these assignments, (e.g. in response to a constraint violation). The constraint management process may reduce variable domain choices, possibly at the direction of a rules engine, via constraint propagation. The constraint management process, using constraint propagation, may return the consistent or inconsistent choices to the rules engine for decision making as well as performing automatic consistency checking as variable value assignments are made by selection/decisions etc. Constraints may be activated or de-activated by a rules engine or a constraints manager. The rules engine may also request the constraints manager to supply a reason for a resultant inconsistency.

For each style there will be a number of art templates appropriate for the type of art objects chosen. For each style (in combination with each material) and set of specific art objects, (size, aspect ratio, positioning, art template rules etc), minimum values for, or combination of, each carton dimension can be determined and used as a constraint. The size domain at the interface is the union of domains associated with each style/material/art object set combination. The latter may be modified by size constraints, which are, for example, supplied by user, or from manufacturing processes etc. In this way the interface size domain of SP1 is presented to, and for use by, the rules engine IR-2 and the interface constraint manager algorithm IA-2 for propagation to SP2.

The algorithms, A1-1 and A2-1 are respectively concerned with determination of a set of carton and box strength performance measures (e.g. top load, stiffness & bulge). IA-1 is concerned with the strength interaction of the carton and box and monitors and utilises the state of the performance measures active variable set on the respective interfaces. A1-1 interacts with V1 to monitor, read or modify the state of the set of variables V1. This may be via an on change event associated with the variable or via a listening process say if there is a highly distributive nature. A change in V1 (e.g. by a user), may trigger activity within A1-1 which may be subsequently propagated into the interface and hence to other sub-process interface variables etc. A1-1 monitors change in a set of variables in V1 via a "listening" or polling process.

As a result of the selection of the goal, the following interface variables for SP1 are set: materials 101, styles 102, arrangement/orientation into the box 103, mass 104, performance variables set and size/dimensions 106, and they are all set to be "active". This is selected by the user, by selecting a goal for the design process but may be directly imposed. Each relationship between variables will dictate the extent of the set of choices the user can make, i.e. at least one must be active otherwise the relationship expresses a fact. The interface variables for SP2 are material 111, style 112, size/dimensions 113 and performance variables set 114. Material and style are active variables and the size/dimensions are passive variables. As a result of a variable being given the property of "passive" or "active", via selection of a set of goals, the ability of a user, or algorithms, of a sub-process to influence the domain of a variable are either enabled or disabled. In this way the user is able to configure the relative dominance of a design sub-process through the selection of design goals. That is, the algorithms and rules selected in association with the goals dictate the way they interact with the internal and interface variables.

A "passive" or "active" property of an interface variable relates to the ability of the sub-process algorithms and rules to change their domain. The interface algorithms and rules may be able to modify a domain if this is required to pursue and satisfy a goal, irrespective of whether the variable is "active" or "passive", from a sub-process perspective.

After the framework for the design process has been specified and checked for consistency, the design process begins. This can be initiated by a user when the user knows they are in receipt of sufficient information or the system can send a message to the user of a sub-process asking them to engage a design task. A user associated with SP1 makes a change to the carton size within V1. Given that there are relationships/rules/constraints involving styles and size and styles and materials this change activates A1-2, which then reassesses the style, board structure, and size domains relative to the SP1 user's current choice. The choice of art components/art templates will constrain size domains and this impact will be via its effect on the size domain. This results in A1-2 modifying the style, material and size domains on its interface. This interface change then activates constraint manager/algorithm IA-2 (IA-2 monitors change in a set of SP1 interface variables via a "listening" or polling process) which evaluates and propagates the change to SP2, resulting in the size domain of SP2 being modified.

The change to the carton size also triggers the rules engine IR-1 to reassess the strength interaction algorithm IA-1 (the variable change results in IA-1 sending IR-1 a message to re-evaluate the selected set of rules/logic and goals). This can be handled either by IA-1 monitoring variable changes and then passing them to IR-1 or by IR-1 monitoring them directly depending on the complexity of the evaluation. This is a system design decision on how rules are best handled. IR-1 evaluates the state/values on interfaces from SP1 & SP2 and relays back to IA-1 appropriate measures to be taken by or modifications of IA-1 in performance evaluations during the solution generation phase. For example the change activates IR-1. IR-1 evaluates the size domains on SP1 & SP2 and the orientation & arrangement from SP1 (this includes loading allowance and headspace). The result is that IR-1 activates a "bulge performance measure" to be included within IA-1—given a specific orientation and level of loading allowance. From this analysis the addition of bulge results IA-1 modifying the size domain on the SP2 interface. R2-1 responds to this change and R2-1 takes the new size domain and modifies the style and material domains of SP2.

Each change must be sanctioned. If the variable change associated with SP1 is in conflict with variable domains of SP2 then the latter may be modified (typically expanded) by the interface components, IA-1 or IR-1, within the absolute constraints set by SP2. If the changes cannot be satisfied by modification other than violating latter the user is informed or blocked from making the change.

Assuming the variable domains are in a satisfactory state (i.e. the domain is not empty/null, the constraints are satisfied and solutions can be generated) the user may initiate an integrated solution generation process over the two design sub-processes (note that, when the design process allows, solution generation or optimisation algorithms local to a sub-process may also be initiated). The constraint manager search algorithm A1-2, IA-2 and A2-2 process and select solution options from the appropriate variable domains. The number of combinations to be tested can be reduced by techniques such as a bounds consistency checking and branch and bound. This process involves determining a carton performance interaction and box performance evaluation. Algorithms IA-1 & A2-1 are used to evaluate the box materials on the basis that the strength requirement can be reduced using the calculated strength contribution and stiffness from the cartons contained by a box. The carton and box specifications, associated with a solution are checked by the appropriate rules engines to ensure suitability of manufacture and compatibility with filling lines. Given that an integrated outcome is consistent with the variable domains/constraints and rules it is saved to memory and subsequently presented to the project manager as part of a solution set associated with the current state of the design definition.

Where solutions do not present themselves, the constraint manager may perform checks against soft constraints. Constraint manager typically embodies "fuzzy logic" to enable it to determine wherein self constraint should be breached.

The project manager can then select a solution or alternatively ask for further analysis to be performed (e.g. on cost or setting another goal to differentiate solutions) before selecting a solution.

EXAMPLE 2

Referring now to FIG. 2 there is shown a schematic representation of an interface between three sub-processes. The second example is for illustrative purposes of potential functions and does not relate to specific sub-processes. Box 50 indicates the user interface configuration module which is used by the project manager to configure the design process as indicated by arrows 54. In this embodiment the project manager is capable of configuring first design sub-process SP1, second design sub-process SP2 and third design sub-process SP3 as well as configuring interface 55.

As shown by the first design sub-process SP1, a design sub-process may incorporate a number of different algorithms which interact with the variable set under the control or management of a rules engine R1-1. The set of variables 56 are all active and hence tend to drive the overall design process. However, the algorithms A1-1 and A1-2 also interact with other passive variables related by filling line 57 and manufacturing site 68 which cannot be altered by A1-1 or A1-2.

Design sub-process SP3 shows that complex processes may be at work within in a design sub-process with a number of different algorithms and rules competing/combining to produce the result. Further, as indicated by active variable 58, the system can incorporate other active variables which are not part of the design process as far as the interface is concerned. Active interface variable 58 may indicate a separate interface with service provider 59 who runs manufacturing site 60.

The group of algorithms and rules IA-1, IR-1 and IA-2 indicate that for example rules engine R1-1 may monitor IA-1 and substitute IA-2 for IA-1 if certain predetermined conditions are met. IA-3 indicates that interface algorithms do not need to interact directly with interface variables. IA-3 can perform some intermediate task such as calculating a value from the passive variable with which it is associated and then passing this value to IA-1.

Various modifications will be apparent to persons skilled in the art and should be considered as falling within the scope of the present invention.

The claims defining the invention are as follows:

1. A computerized system for controlling a manufacturing design process including a first design sub-process and a second design sub-process, outcomes of one of the first and second design sub-processes being linked to outcomes of the other of the first and second design sub-processes and vice versa by a relationship between one or more first design sub-process variables (A) and one or more second design sub-process variables (B), the system comprising:
   a processor programmed to provide a configurable interface between said first and second design sub-processes, said configurable interface allowing inputs to said system to control the manufacturing design process by specifying which of the one or more variables (A,B) are active variables, each of which can have its domain modified by at least one process within the sub-process to which the each active variable belongs, and which of the one or more variables (A,B) are passive variables, each of which has its domain determined within allowable values by domains of the other variable or variables in the relationship but not by any process within the sub-process to which the each passive variable belongs, and to determine a manner of evaluation of the relationship and a dominance of a sub-process in the manufacturing design process from the specifying of which of the variables are active variables and which are passive variables.

2. A computerized system as claimed in claim 1, wherein the configurable interface defines a plurality of possible relationships between the first and second design sub-processes and the configurable interface comprises relationship selection means allowing inputs to select at least one relationship from the plurality of relationships.

3. A computerized system as claimed in claim 2, wherein the relationship selection means allows inputs to select a plurality of relationships.

4. A computerized system as claimed in claim 2, wherein the configurable interface is configured to specify which variables are treated as active and which are treated as passive on the basis of the selected relationship.

5. A computerized system as claimed in claim 1, wherein the configurable interface comprises goal specification means which allows inputs to specify a goal or goals of the design process and wherein the configurable interface is configured to specify the relationship on the basis of the user specified goal or goals.

6. A computerized system as claimed in claim 1, wherein there is more than one relationship between the first and second design sub-processes.

7. A computerized system as claimed in claim 1, wherein the relationship comprises either:
   one or more rules; or
   one or more algorithms; or
   a combination of one or more rules and one or more algorithms.

8. A computerized system as claimed in claim 1, wherein there are more than two sub-processes.

9. A computerized system as claimed in claim 8, wherein there are relationships between either all or some of the sub-processes.

10. A computerized system as claimed in claim 8, wherein there are relationships between more than two sub-processes.

11. A computerized system as claimed in claim 1, wherein the system allows constraints to be placed on a domain of a variable.

12. A computerized system as claimed in claim 11, wherein the system allows the constraints to be defined as hard constraints which cannot be breached or soft constraints which can be breached if other conditions are satisfied.

13. A computerized system as claimed in claim 1, further comprising an optimisation engine for optimising the manufacturing design process using one or more rules to analyse available solutions of the manufacturing design process.

14. A computerized system as claimed in claim 13, wherein the optimisation engine is configured to compare potential solutions to the manufacturing design process with pre-existing solutions to enable pre-existing solutions to be identified.

15. A computerized system as claimed in claim 1, wherein the configurable interface comprises relationship specification means for specifying the relationship between the sub-processes.

16. A method for controlling a manufacturing design process including a first design sub-process and a second design sub-process, outcomes of one of the first and second design sub-processes being linked to outcomes of the other of the first and second design sub-processes and vice versa by a relationship between one or more first design sub-process variables (A) and one or more second design sub-process variables (B), the method comprising:

providing a configurable interface between the first and second design sub-processes and configuring the configurable interface to control the manufacturing design process by specifying which of the one or more variables (A,B) are active variables, each of which can have its domain modified by at least one process within the sub-process to which the each active variable belongs, and which of the one or more variables (A,B) are passive variables, each of which has its domain determined within allowable values by the domains of the other variable or variables in the relationship but not by any process within the sub-process to which the each passive variable belongs, determining a manner of evaluation of the relationship and a dominance of a sub-process in the manufacturing design process from the specifying of which of the variables are active variables and which are passive variables, and storing a result of the determining for use in controlling the manufacturing design process.

17. A method as claimed in claim 16, further comprising specifying the relationship.

18. A method as claimed in claim 17, further comprising specifying the relationship by selecting at least one relationship from a plurality of possible relationships between the first and second design sub-processes.

19. A method as claimed in claim 18, comprising specifying which variables are treated as active and which are treated as passive on the basis of the selected relationship.

20. A method as claimed in claim 17, comprising specifying the relationship on the basis of specified goal or goals.

21. A method as claimed in claim 16, further comprising placing constraints on the domain of at least one variable.

22. A method as claimed in claim 21, further comprising defining the constraints as a hard constraint which cannot be breached or soft constraint which can be breached if other conditions are satisfied.

23. A method as claimed in claim 16, further comprising optimising the manufacturing design process using one or more rules to analyse available solutions of the manufacturing design process.

24. A method as claimed in claim 23, further comprising comparing potential solutions to the design process with pre-existing solutions to enable pre-existing solutions to be identified.

25. A computer-readable medium on which computer-executable instructions for method for controlling a manufacturing design process are encoded, the manufacturing design process including a first design sub-process and a second design sub-process, outcomes of one of the first and second design sub-processes being linked to outcomes of the other of the first and second design sub-processes and vice versa by a relationship between one or more first design sub-process variables (A) and one or more second design sub-process variables (B), wherein the method comprises:

providing a configurable interface between the first and second design sub-processes and configuring the configurable interface to control the manufacturing design process by specifying which of the one or more variables (A,B) are active variables, each of which can have its domain modified by at least one process within the sub-process to which the each active variable belongs, and which of the one or more variables (A,B) are passive variables, each of which has its domain determined within allowable values by the domains of the other variable or variables in the relationship but not by any process within the sub-process to which the each passive variable belongs, determining a manner of evaluation of the relationship and a dominance of a sub-process in the manufacturing design process from the specifying of which of the variables are active variables and which are passive variables, and storing a result of the determining for use in controlling the manufacturing design process.

\* \* \* \* \*